(12) United States Patent
Vareljian (10) Patent No.: US 6,480,532 B1
(45) Date of Patent: Nov. 12, 2002

(54) ECHO CANCELLATION FOR AN ADSL MODEM

(75) Inventor: Albert Vareljian, Nepean (CA)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/352,813

(22) Filed: Jul. 13, 1999

(51) Int. Cl.[7] .............................................. H04L 12/00
(52) U.S. Cl. ...................... 375/222; 375/217; 375/220; 375/221; 375/288; 375/296; 375/328; 375/343; 375/349; 375/350; 375/351
(58) Field of Search .............................. 375/216, 217, 375/219, 220, 221, 222, 224, 286, 288, 295, 296, 316, 328, 343, 346, 349, 350, 351, 257

(56) References Cited

U.S. PATENT DOCUMENTS

| | | | | |
|---|---|---|---|---|
| 5,278,872 A | * | 1/1994 | Greenberg | 348/614 |
| 5,512,898 A | * | 4/1996 | Norsworthy et al. | 341/155 |
| 5,623,513 A | * | 4/1997 | Chow | 375/219 |
| 6,181,753 B1 | * | 1/2001 | Takada | 375/346 |
| 6,226,322 B1 | * | 5/2001 | Mukherjee | 375/229 |

OTHER PUBLICATIONS

Reeve, "Subscriber Loop Signaling and Transmission Handbook—Analog", IEEE Press (1992), p. 104.

* cited by examiner

Primary Examiner—Chi Pham
Assistant Examiner—Pankaj Kumar
(74) Attorney, Agent, or Firm—Lisa K. Jorgenson; Andre Szuwalski (57) ABSTRACT

An echo cancellation functionality taps a digital transmit signal from a transmit channel for processing through an adaptive filter of an echo channel to generate an echo cancellation signal. The adaptive filter has a transfer function substantially matching an echo transfer function which defines a relationship between the transmit signal and an unwanted echo component corrupting an analog receive signal. The echo cancellation signal is digital-to-analog converted to an analog signal and then subtracted from the analog receive signal to substantially cancel out the unwanted echo component. The echo cancellation functionality may be configured in a training mode to generate an error signal used to adaptively configure the adaptive filter transfer function to substantially match the echo transfer function. When in training mode, certain components of an adaptation loop which contribute to a feedback loop transfer function are selectively by-passed. The adaptive filter may comprise a least mean square finite impulse response filter implementing a predistortion function to account for the feedback loop transfer function.

30 Claims, 6 Drawing Sheets

ECHO CANCELLATION FOR AN ADSL MODEM

BACKGROUND OF THE INVENTION

1. Technical Field of the Invention

The present invention relates to modem technology and, in particular, to an echo canceler for use within a modem.

2. Description of Related Art

The physical media for carrying telephone communications to and from a residence typically comprises a twisted pair of copper wires. The twisted pair supports a communications bandwidth of several mega-hertz. Only the lower portion of that supported bandwidth from 300–4,000 Hz (i.e., the voice band), however, is typically used in conventional telecommunications networks to carry user telephone and data communications. The remainder of the available bandwidth on a twisted pair has not been used for data communications due primarily to a lack of support at the network and concerns over attenuation. Notwithstanding the foregoing, there would be an advantage to separating data from voice communications and moving the data communications over the twisted pair out of the voice band. This would allow for the use of a single twisted pair media to simultaneously carry both a voice and data communication.

Asymmetric Digital Subscriber Line (ADSL) provides a new modem technology that converts an existing twisted pair line into a plurality of access paths for multimedia and high speed data communications. ADSL transmits more than six megabits per second on the downlink to the user, and six-hundred forty kilo-bits per second or more in both directions (up and down), while simultaneously allowing conventional use of the twisted pair to carry user voice communications within the voice band. Using ADSL technology, the existing telecommunications network can be transformed to fully and efficiently support voice, text, file transfer, high resolution graphics and multimedia service delivery to every user.

Figure 1:
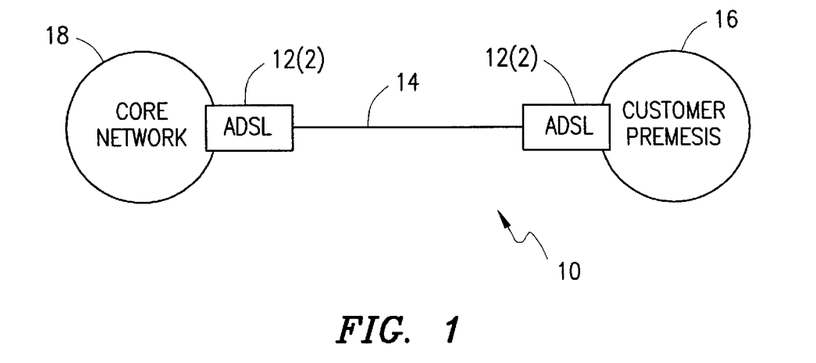
FIG. 1, previously described, is a block diagram of a telecommunications network supporting the use of ADSL technology.

Referring now to FIG. 1, there is shown a block diagram of a telecommunications network 10 supporting the use of ADSL technology. An ADSL modem 12 is connected at each end of a twisted pair telephone line 14. At one end of the line 14, a first modem 12(1) interfaces with customer premises equipment 16 comprising, for example, a conventional telephone set or a personal computer. At the other end of the line 14, a second modem 12(2) interfaces with the conventional core telecommunications network 18. The pair of modems 12 function to create three channels for the communication of information over the twisted pair line 14. The first channel is a high speed downlink channel suitable for the communication of data (such as a file transfer) to the user. The second channel is a medium speed duplex channel suitable for the communication of data between the customer premises equipment 16 and the conventional core telecommunications network 18. Each of the first and second channels may be sub-multiplexed as needed to form multiple, lower rate, channels. The third channel comprises a plain old telephone service (POTS) or integrated services digital network (ISDN) channel suitable for supporting conventional voice and data services. The POTS/ISDN channel is typically split off at the customer premises equipment 16 by filters in the modem 12 to ensure uninterrupted provision of conventional voice and data services in the event the modem 12 should fail.

Figure 2A:
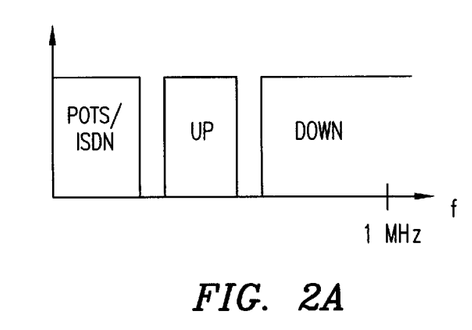
FIGS. 2A and 2B, previously described, are diagrams illustrating frequency allocation for ADSL modem communications.
Figure 2B:
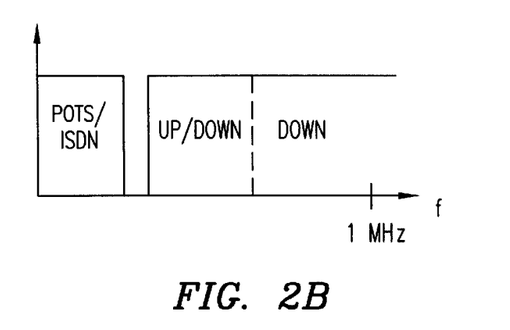

To create the multiple channels, the ADSL modem 12 divides the available bandwidth of the twisted pair telephone line in one of two ways. First, as illustrated in FIG. 2A, frequency division multiplexing (FDM) is used to assign one sub-band to carry uplink data (from the customer premises equipment 16) and another band to carry downlink data (to the customer premises equipment 16). Second, as illustrated in FIG. 2B, the bands for uplink and downlink data communication are assigned to partially overlay one another, and local echo cancellation is used at each end of the twisted pair line 14 to separate the two bands from each other and recover the transmitted information. In either case, the ADSL modem 12 splits off the four kilohertz voice band at the DC end of the available bandwidth to support conventional communications services.

It is recognized that twisted pair telephone lines 14 having a long length significantly attenuate communicated information signals at around one megahertz (i.e., at the outer edge of the bandwidth used by ADSL) by as much as ninety dB. It is accordingly necessary that the transmitter in the modem 12 transmit its high speed downlink channel or medium speed duplex channel signals over the line 14 with a relatively high signal power. The increased transmit signal power, however, does create some difficulties such as an unwanted local echo at the modem 12 which may adversely affect the modem's ability to detect receive signals while in a duplex operational mode.

Figure 3:
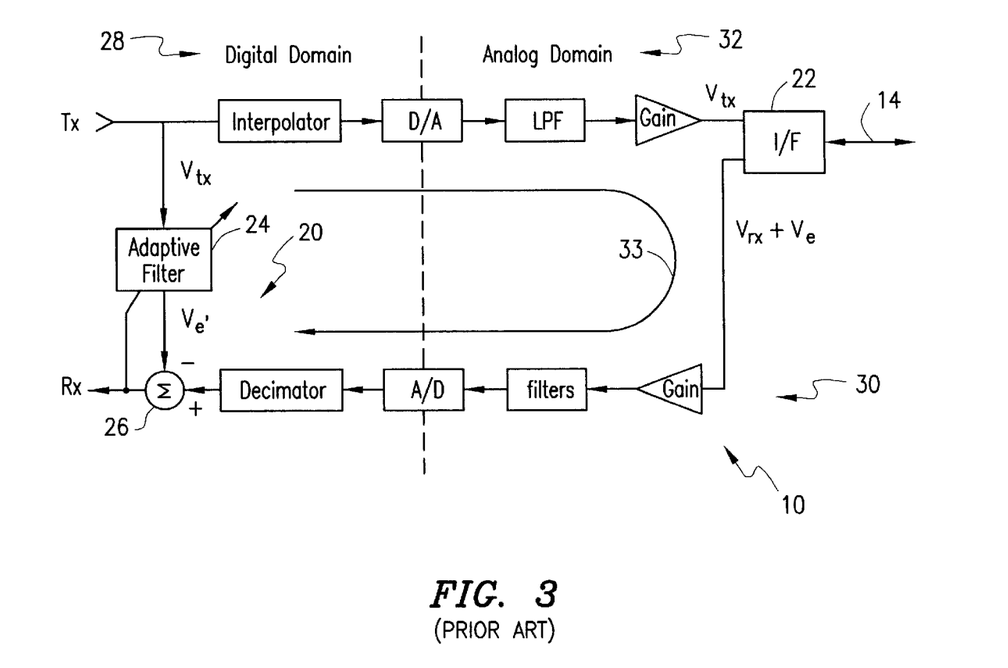
FIG. 3, previously described, is a block diagram for a traditional, prior art, fully digital domain adaptive echo canceler.

Provision of an echo cancellation functionality within the modem 12 would adequately address this difficulty and substantially eliminate the local echo. A block diagram for a traditional, prior art, fully digital domain adaptive echo canceler 20 for use within the ADSL modem 12 is shown in FIG. 3. The echo problem arises at the twisted pair line interface 22 for the modem 12 where a portion Ve (called near end or local echo) of the transmit signal Vtx appears in the received signal Vrx (due, for example, to leakage across the interface 22 or reflection/impedance mismatch along the twisted pair line 14). In the echo canceler 20, the generation of the echo cancellation signal Ve' (see, at the output of adaptive filter 24Y and cancellation operation itself (see, at summer 26 are performed directly and wholly in the digital domain 28.

Due to the high losses experienced with transmission of signals over the twisted pair line 14, the magnitude of the receive component Vrx of the composite signal Vrx+Ve may be very small relative to the magnitude of the echo portion Ve. This implies that the modem 12 components in the receive channel 30, especially those components located within the analog domain 32 (such as the receive amplifier, filters and analog-to-digital converter), must be capable of handling signals with a relatively large dynamic range (in the order of 80–90 dB). While it is possible to design and build such a device, its design and implementation present quite complicated and expensive propositions that detract from the advantages of ADSL technology. Still another limitation of a fully digital echo canceler is the substantial computational complexity of the adaptive filter 24 (comparable of that of an entire modem), which arises due to the high complexity of the echo path 33 transfer function that incorporates transmit, echo and receive chains. There is accordingly a need for a less complicated and expensive echo cancellation functionality for use within ADSL modems.

SUMMARY OF THE INVENTION

A modem including an echo cancellation functionality includes both a digital processing domain and an analog processing domain. A digital transmit signal is processed through a transmit channel and output over a twisted pair, with a portion of the transmit signal appearing within a received signal as an unwanted echo component. The echo cancellation functionality taps the digital transmit signal from the transmit channel in the digital processing domain. The tapped signal is processed in an echo channel through an adaptive filter (whose transfer function substantially matches an echo transfer function) in the digital processing domain to generate a digital echo cancellation signal. The digital echo cancellation signal is then converted to an analog echo cancellation signal and subtracted in the analog processing domain from the received signal (which includes the unwanted echo component) to substantially cancel the echo before further processing in a receive channel of the modem.

The echo cancellation functionality is implemented within the modem to provide two operational modes. In a first (training) mode of operation, the echo cancellation functionality configures the transmit channel, echo channel and receive channel of the modem to either by-pass certain modem components having transfer functions that would otherwise introduce amplitude and phase distortions in an error signal (comprising the echo component minus the echo cancellation signal), or to define some transfer functions in the modem, in order to tune the transfer function of the adaptive filter to substantially match the echo transfer function. Following completion of the training mode of operation, the echo cancellation functionality configures the modem into a second (operating) mode of operation to support information transfer to and from the modem over the twisted pair.

The adaptive filter may comprise any tunable finite or infinite impulse response filter including known least mean square, Kalman and recursive mean square types. Preferably, however, the modem comprises a least mean square type finite impulse response adaptive filter that may also contain a predistortion function in accordance with the present invention. The adaptive filter accordingly includes a first n-tap delay line and a recursive tap weight update section in accordance with conventional filter design. To implement the predistortion function, the adaptive filter further includes a second n-tap delay line with a filter block whose transfer function substantially matches a combined transfer function for an adaptation loop of the modem comprising the echo channel and the receive channel. The outputs of the second n-tap delay line then generate a predistortion vector for input to the recursive tap weight update section of the adaptive filter.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4:
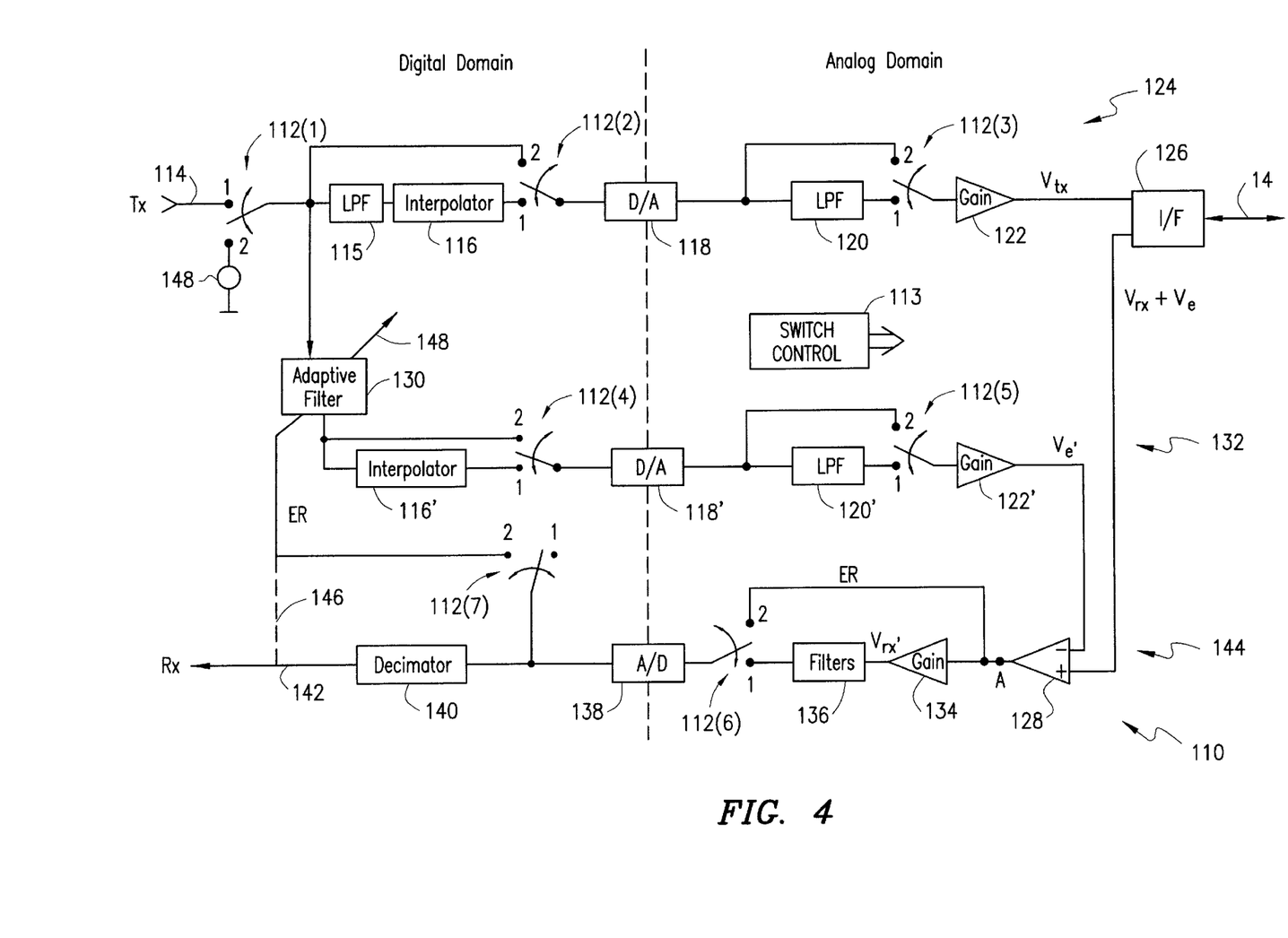
FIG. 4 is a block diagram for a mixed analog/digital domain adaptive echo canceler of the present invention.

Reference is now made to FIG. 4 wherein there is shown a block diagram for a mixed analog/digital domain adaptive echo canceler 110 of the present invention for use within the ADSL modem 12 of FIG. 1. The echo canceler 110 includes a plurality of analog and digital switches 112 operable to switch the modem 12 (and more particularly its echo cancellation functionality) between an operating mode (selected generally speaking when the switches 112 are placed in the "1" position) and a training mode (selected generally speaking when the switches 112 are placed in the "2" position). More specifically, a switch controller 113 selects switch 112 position (either "1" or "2") of certain ones of the switches and thus places the echo canceler 110 in the proper mode of operation.

Assuming for the moment that all switches are in the operating "1" position, a digital transmit signal is received on line 114 and passes through switch 112(1) for processing in a low pass filter 115 (whose function is described below) and an interpolator 116. The output digital signal from the interpolator 116 then passes through switch 112(2) and is converted to an analog signal by digital-to-analog converter 118. The resulting analog signal is then low pass filtered 120, passed through switch 112(3), and amplified 122 to generate a transmit signal Vtx. The interpolator 116, digital-to-analog converter 118, low pass filter 120 and amplifier 122 define a transmit channel 124 for the modem 12. A line interface 126 then interfaces the transmit signal Vtx output from the transmit channel 124 onto the twisted pair line 14 for communication.

As with prior art modems of this type, an echo problem arises at the twisted pair line interface 126 for the modem 12 where a portion Ve (called near end or local echo) of the transmit signal Vtx appears within the received signal Vrx (due, for example, to leakage across the interface 126 or reflection/impedance mismatch along the twisted pair line 14). This echo signal Ve can be defined by an echo transfer function E(s) in terms of:

$$Ve(s)=Vtx(s) \cdot E(s).$$

Generally speaking, the nature of the interface 126 and the line impedance matching conditions result in E(s) having a modulus that is essentially of the high pass type with a magnitude typically oscillating around 0.5 in the frequency band of interest (but may, under various termination conditions, have a normalized magnitude with a value of anywhere between zero and one). Due to the high losses experienced with transmission of signals over the twisted pair line 14, the magnitude of the receive component Vrx of the composite signal Vrx+Ve may be very small relative to the magnitude of the echo portion Ve. This could make it very difficult, absent effective cancellation and/or proper signal processing, to detect and recover the received signal Vrx. It is therefore vitally important to cancel out this Ve component as efficiently as possible.

In accordance with the present invention, the cancellation of the Ve echo component occurs in the analog domain by having a subtractor 128 subtract an echo cancellation signal Ve' from the composite signal Vrx+Ve. As a result, a receive signal Vrx' is generated that is substantially equal to the receive signal Vrx received over a the line 14 at the interface 126. The echo cancellation signal Ve', however, is generated by processing the digital transmit signal received on line 114 (after passing through switch 112(1)) through a digital domain adaptive finite impulse response (FIR) filter 130 having a transfer function $H_{FIR}(Z)$ which adaptively approximates the echo transfer function E(s). The output of the adaptive filter 130 is then processed in an interpolator 116' whose transfer function in the z domain matches that of the interpolator 116 in the transmit channel 124. The output digital signal from the interpolator 116' then passes through switch 112(4) and is converted to an analog signal by a digital-to-analog converter 118' whose operational characteristics mimic, are the same as, or are substantially the same as, those of the converter 118 in the transmit channel 124. The resulting analog signal is then low pass filtered 120', passed through switch 112(5), and amplified 122' to generate the echo cancellation signal Ve'. The low pass filter 120' and amplifier 122' each may have operational characteristics that mimic, are the same as, or are substantially the same as, those of the corresponding components in the transmit channel 124. The adaptive filter 130, interpolator 116', digital-to-analog converter 118', low pass filter 120' and amplifier 122' define an echo channel 132 for the modem 12. The resulting echo cancellation signal Ve' which is generated from the operation of the adaptive filter 120 in digital domain is then subtracted by subtractor 128 in the analog domain from the composite signal Vrx+Ve output from the interface 126 to generate a corrected receive signal Vrx' through the use of a mixed analog/digital domain echo cancellation functionality.

The signal Vrx' output from the subtractor 128 at node "A" is then amplified 134 and filtered (high pass and low pass) 136. The analog filtered output is then passed through switch 112(6) and converted to a digital signal by analog-to-digital converter 138. The digital signal output from the converter 138 is then passed through a decimator 140 and output on receive line 142. The amplifier 134, filters 136, analog-to-digital converter 138 and decimator 140 define a receive channel 144 for the modem 12.

Figure 5:
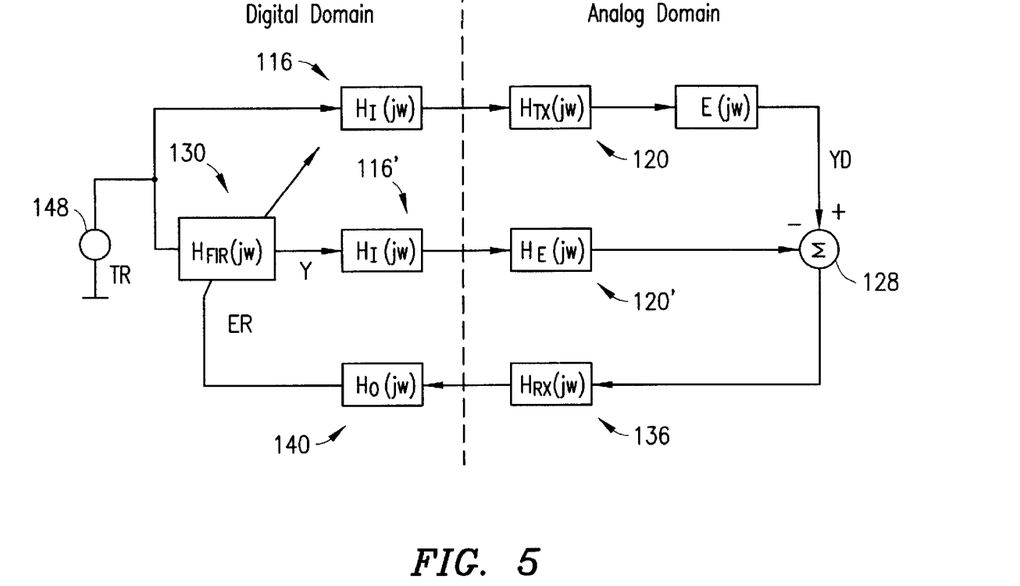
FIG. 5 is a signal flow graph representation of the mixed analog/digital domain adaptive echo canceler of the present invention.

Reference is now made to FIG. 5 wherein there is shown a signal flow graph representation of the mixed analog/digital domain adaptive echo canceler 110 of the present invention. In this signal flow diagram representation, it is assumed that all switches 112 have been placed in the operate "1" position, the received signal Vrx is zero, the error signal is fed into the adaptive filter 130 by way of the dashed line connection 146, and the filters 120, 120' and 136 in the transmit channel 124, echo channel 132 and receive channel 144, respectively, implement analog filtering (including its sample and hold operation). It is further assumed that the conversion time in the converters 118, 118' and 138 in the transmit channel 124, echo channel 132 and receive channel 144, respectively, is negligibly small in comparison to the sampling period. Still further, sinusoidal inputs from signal generator 148 are assumed, and thus the transfer functions H and E for the corresponding components in the canceler 110 are defined in terms of the complex frequency variable jω, and all signals in the signal flow diagram may be represented by their Fourier transforms. More specifically, the transfer function $H_I(j\omega)$ defines the transfer characteristics of the interpolators 116 and 116', the transfer function $H_D(j\omega)$ defines the transfer characteristics of the decimator 140, the transfer function $H_{TX}(j\omega)$ defines the transfer characteristics of the transmit filter 120, the transfer function $H_E(j\omega)$ defines the transfer characteristics of the echo filter 120', and the transfer function $H_{RX}(j\omega)$ defines the transfer characteristics of the receive filters 136. The transfer functions $H_{FIR}(j\omega)$ and E(jω)) are as discussed above relating to the transfer function of the adaptive filter 130 and the echo transfer function at the interface 126.

The transform TR corresponds to the training signal output of the signal generator 148. The transform Y corresponds to the output of the adaptive filter 130 wherein:

$$Y = TR \cdot H_{FIR}.$$

The transform YD corresponds to the receive channel output from the interface 126. The transform ER corresponds to the error signal which drives the adaptive filter 130. Now, assuming that YD=0 (i.e., the non-inverting input to the summer 128 is grounded), then the transform ER is defined by:

$$ER = -Y \cdot H_I \cdot H_E \cdot H_{RX} \cdot H_D.$$

Ideally, the goal would be to have the error signal ER be one-hundred percent correlated to the output Y of the adaptive filter 130. However, the foregoing indicates that the correlation between ER and Y is affected by amplitude and phase distortions introduced in the error signal ER by the transfer functions H for the components (interpolator 116', filter 120', filters 136 and decimator 140) of the echo channel 132 and receive channel 144. When these distortions exceed certain limits, the result is a loss of convergence in the adaptive filter 130 and an inability to drive the error signal ER substantially to zero. The conclusion reached from this is that the adaptive filter 130, no matter what its composition (e.g., least mean square (LMS), Kalman, or recursive least square (RLS)), is very sensitive to foreign phase and amplitude shifts in the adaptation loop defined by the echo channel 132 and receive channel 144.

Figure 8:
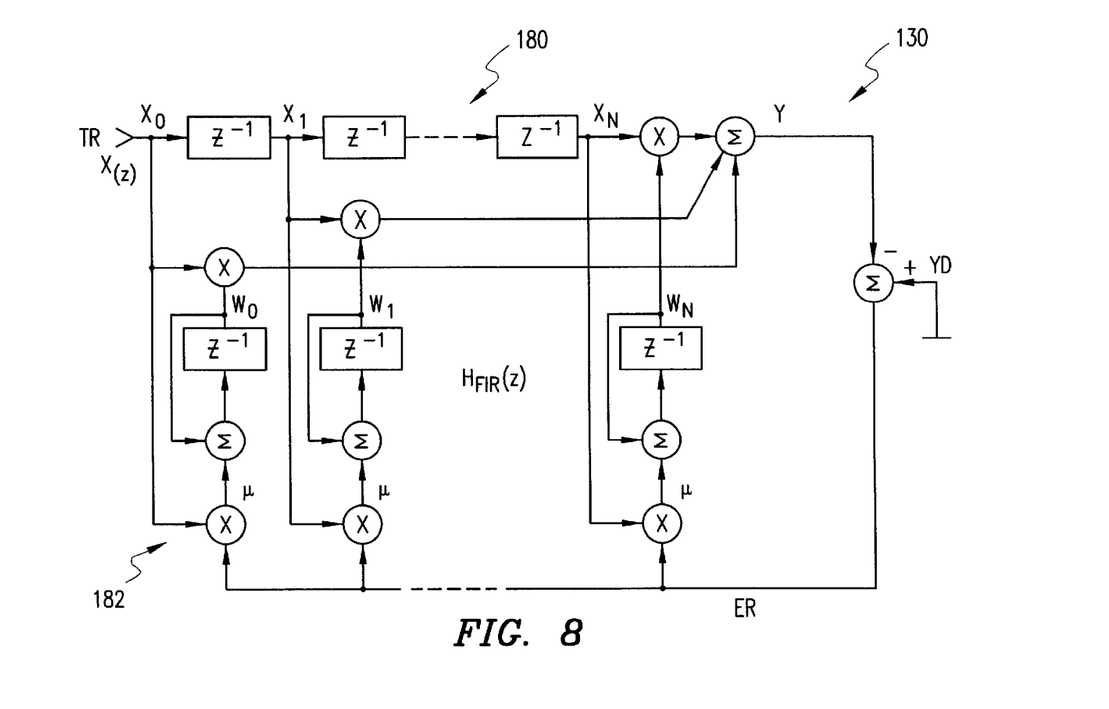
FIG. 8 is a signal flow graph of the canonic structure of a conventional least mean square (LMS) finite impulse response adaptive filter.

Reference is now made to FIG. 8 wherein there is shown a signal flow graph of the canonic structure (YD=0) of a conventional least mean square (LMS) finite impulse response adaptive filter. The filter includes an n-tap delay line 180 and a recursive tap weight update section 182 fed from that delay line in a conventional fashion, realizing the following tap update equation at the i-th adaptive step:

$$w(i+1) = w(i) + \mu \cdot er(i) \cdot x(i)$$

wherein:

$\mu$ is the adaptation constant;

$w(i+1)$ is the updated tap weight vector used at the next adaptation step;

$w(i) = [w_0(i), w_1(i) \ldots w_N(i)]$ and
$x(i) = [x_0(i), x_1(i) \ldots x_N(i)]$
are the FIR tap weight and tap input vectors, respectively, at the i-th adaptation step;

N is the FIR length; and er(i)=yd(i)−y(i)

is the error between the desired response yd at the output of the system and the adaptive filter response y.

Such an adaptive filter may be used for the adaptive filter 130 of the echo canceler 110 of FIG. 4. For the n-th tap (Vn) update multiplier input signal $x_n$, the following relation in the z-domain may be written:

$$\frac{ER(z)}{X_n(z)} = \frac{-Y(z)}{X_n(z)} = -H_{FIR}(z) \cdot z^n \bigg|_{YD=0} \quad (2)$$

wherein $H_{FIR}(Z)$ represents the transfer function of the finite impulse response filter section at a given adaptation step in the training process:

$$H_{FIR}(z) = \frac{Y(z)}{X(z)} = \sum_{i=0}^{N} w_i \cdot z^{-i}$$

The relation (2) recited above holds true irrespective of system order and at any given adaptation step. Assuming then that the relation is system invariant, it may be implied that the relation also must be observed for the respective signals in the structure of FIG. 5. Thus, the following necessary condition for the system's operational equivalence with the canonic structure may be deduced. Rewriting the form of equation (2) as this would imply to the structure of FIG. 5 using equation (1):

$$\frac{ER}{X_n} = \frac{-Y \cdot H_I \cdot H_E \cdot H_{RX} \cdot H_D}{X_n} = -H_{FIR} \cdot z^n \quad (4)$$

you may observe the following: as the numerator in (4) now has a product term introduced by the transfer functions of the components in the echo channel 132 and receive channel 144, you may "scale" accordingly the finite impulse response tap input vector Xn in the denominator such that the right hand side of the equation still holds. This corresponds to the following operation:

$$\hat{X}(z) = X(z) \cdot H_{PD}(z)$$

wherein $H_{PD}$ is a "predistortion" transfer function. The cap on the left hand side of the foregoing equation designates the predistorted finite impulse response tap input vector that should be used for the least mean square algorithm such that:

$$\frac{ER}{\hat{X}_n} = \frac{-Y \cdot H_I \cdot H_E \cdot H_{RX} \cdot H_D}{X_n \cdot H_{PD}} = -H_{FIR} \cdot z^n \quad (6)$$

In order to satisfy the relation (2) by ensuring mutual cancellation of terms in the numerator and denominator, the predistortion transfer function $H_{PD}$ should reproduce exactly the transfer function for the adaptation loop through the echo channel 132 and receive channel 144 of:

$$H_{PD} = H_I \cdot H_E \cdot H_{RX} \cdot H_D.$$

The physical meaning of the transformations is that for a pair of signals with a given cross correlation, if one signal passes through a filter with corresponding amplitude and phase characteristics, then the second signal should simultaneously pass through the filter with similar characteristics if the cross-correlation of the signals is to be preserved.

Reference is now again made to FIG. 4. In accordance with the present invention, the switch controller 113 configures the modem 12 in a short training mode (perhaps as often as at the beginning of each new session or conversation). The switches 112 are accordingly placed by the switch controller 113 in the training "2" position. A digital training signal output from the generator 148 is applied to the transmit channel 124 and passes through switch 112(1) by-passing any processing in the interpolator 116. This digital training signal then passes through switch 112(2) and is converted to an analog signal by digital-to-analog converter 118. The resulting analog (training) signal then by-passes any processing in the low pass filter 120, passes through switch 112(3), and is amplified 122 to generate a transmit (training) signal Vtx. The line interface 126 then interfaces the transmit (training) signal Vtx output from the transmit channel 124 onto the twisted pair line 14.

A portion Ve (called near end or local echo) of the transmit (training) signal Vtx appears within the received signal Vrx (due, for example, to leakage across the interface 126 or reflection/impedance mismatch along the twisted pair line 14). However, because the modem is configured in training mode at the beginning of each new conversation or session, the received signal Vrx is equal to zero. Thus, only the echo (training) signal Ve is applied (during training mode) to the non-inverting input of the summer 128.

The digital training signal output from the generator 148 is further applied (after passing through switch 112(1)) to the echo channel 132 and processed by the digital domain adaptive finite impulse response (FIR) filter 130 having a transfer function $H_{FIR}(z)$. The echo (training) digital signal output from the adaptive filter 130 then bypasses any processing in the interpolator 116'. The echo (training) digital signal then passes through switch 112(4) and is converted to an analog signal by digital-to-analog converter 118' whose operational characteristics mimic, are the same as, or are substantially the same as, those of the converter 118 in the transmit channel 124. The resulting analog echo (training) signal then by-passes any processing in the low pass filter 120', passes through switch 112(5), and is amplified 122' to generate the echo (training) cancellation signal Ve' for application to the inverting input of the summer 128. The echo (training) cancellation signal Ve' is then subtracted from the echo (training) signal Ve to generate an error (training) signal ER.

The error (training) signal ER output from the subtractor 128 at node "A" then by-passes any processing in the amplifier 134 and filters 136 of the receive channel 144. This analog error (training) signal ER is then passed Although switch 112(6) and converted to a digital error (training) signal ER by analog-to-digital converter 138. The digital error (training) signal ER output from the converter 138 then passes through switch 112(7) by-passing any processing in the decimator 140 and is applied to the adaptive filter 130. Responsive to the error (training) signal ER, the adaptive filter 130 is self-adjusted (as generally indicated by arrow 148) to dynamically configure the transfer function $H_{FIR}(Z)$ through adaptation to approximate the echo transfer function E(s). This adaptation affects the echo (training) cancellation signal Ve' and with each iteration eventually drives the error (training) signal ER to substantially zero. Following completion of the training mode (either based on a time expiration or driving of the signal ER close enough to zero), the switches 112 are returned by the switch controller 113 to the operate "1" position, the adaptive filter 130 is thus configured to generate the proper echo cancellation signal Ve', and modem 12 duplex communications over the twisted pair line 14 are established through the interface 126.

With respect to operation of the modem 12 in the training mode, in a multi-rate system where a number of up-sampled rates are usually available, the sampling frequency during training should be chosen high enough such that the Nyquist band sufficiently covers the intended echo cancellation band. The echo cancellation band can be made even wider than the actual transmit band in order to achieve better echo cancellation results.

Based on the foregoing considerations, and in accordance with the present invention, two distinguished configurations for the echo canceler are devised. Both configurations address the non-convergence concern in the adaptive filter mentioned above in a specific way such that the stated condition of equation (2) is met in the echo canceler system.

Figure 12:
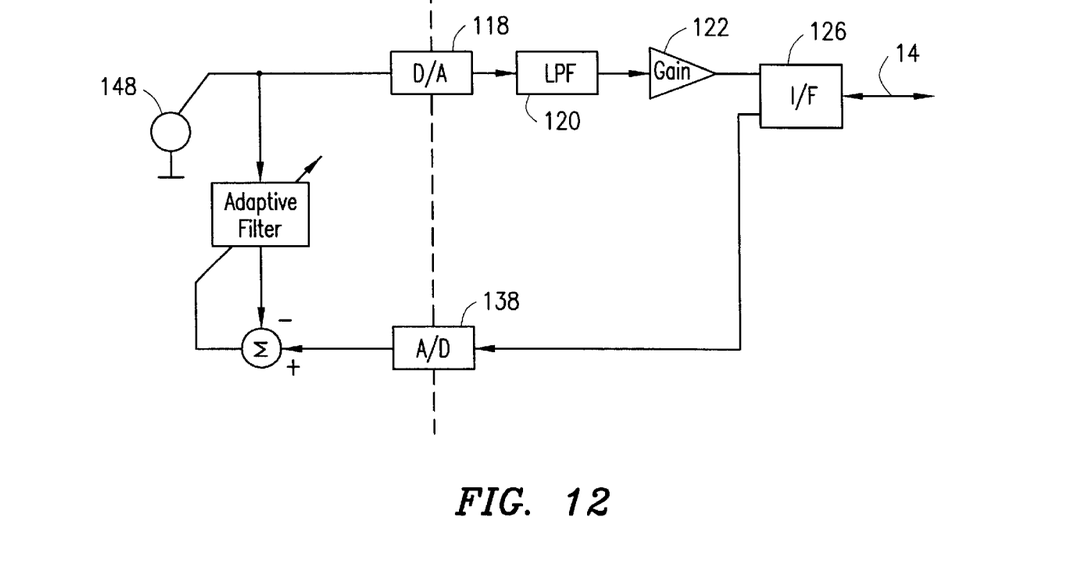
FIG. 12 is a block diagram representation of the modem of FIG. 4 when configured in training mode.

The first configuration assumes the special case of no filtering in the adaptation loop in the system of FIG. 5 (i.e., $H_{PD}$ is 1). The corresponding modem training mode may be illustrated in FIG. 4 by placing switches 112(2), 112(4), 112(5), 112(6) and 112(7) in the training position "2" while keeping switch 112(3) in the operating position "1" (to provide some needed smoothing of the training signal). As there is no smoothing that needs to be performed in the analog section in the adaptation loop for this mode, the whole operation can be accomplished directly in the digital domain as is shown in FIG. 12. As the relation (2) automatically holds for this training mode, the adaptive filter convergence is guaranteed with a proper choice of $\mu$. The actual echo channel of the modem is not required in this mode (as illustrated), so it must be disconnected by disabling, for example, the converter 118'. The adaptation of the filter 130 may be performed either in real time, during acquisition of the training signal, or off-line after the acquisition is completed, in either case using the above-mentioned LMS algorithm. The adaptive filter transfer function converges essentially to the product of the echo and low pass filter transfer functions.

In the operation mode, the converged $H_{FIR}$ is connected to the echo channel via interpolator 116', D/A converter 118', smoothing low pass filter 120' and amplifier 122'. At the same time, to account for the amplitude and phase distortions introduced by the low pass filter 120', a filter with substantially identical characteristics must be introduced in the transmit channel 124. This is best accomplished in the digital domain as indicated in FIG. 4 using the filter 115. The transfer function for this digital filter that must mimic, be the same as, or be substantially the same as, the analog transfer function of the low pass filter 120' may be obtained by training the adaptive filter (perhaps performed once at the factory), which then automatically takes into account the imperfection effects in the analog filter 120' due to component tolerances and the like. This training is accomplished as follows: the switches 112(1), 112(4), 112(6) and 112(7) are placed in the "2" position, and switch 112(5) is placed in the "1" position. The transmit channel 124 is disconnected by disabling, for example, the converter 118. At the end of the training operation, the adaptive filter 130 converges essentially to the scaled and inverted transfer function of low pass filter 120'. After adaptation, the transfer function of the adaptive filter 130 is multiplied by minus one and divided by the gain of the amplifier 122' to compensate for their respective effects. This transfer function is then stored in non-volatile memory for subsequent use in the modem operation after deployment. It will, of course, be understood that the filter 115 is not required in situations where the amplifiers 122 and 122' perform the smoothing operation.

Figure 6:
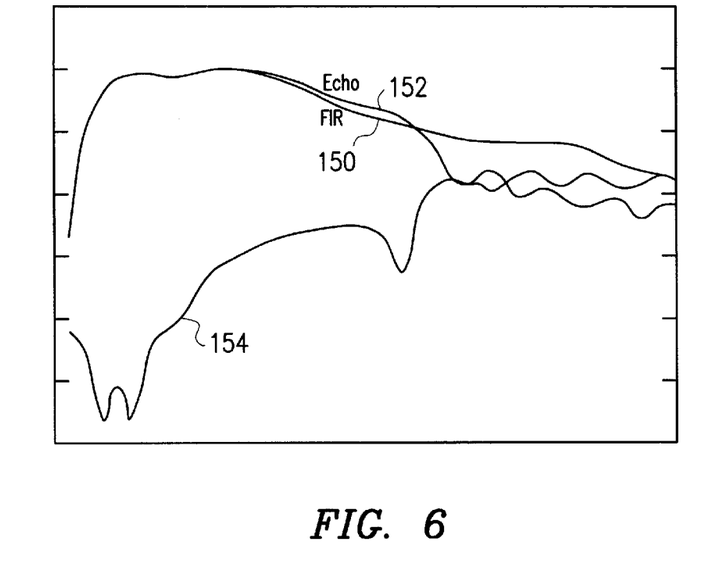
FIG. 6 is a frequency response diagram illustrating a correlation between adaptive filter response and echo response following training.
Figure 7A:
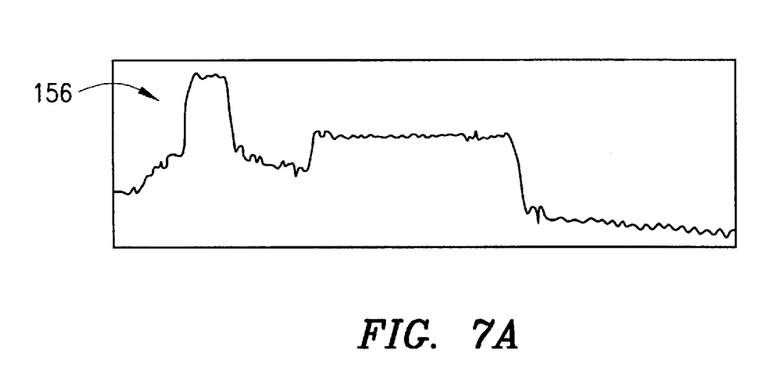
FIGS. 7A and 7B are frequency response diagrams illustrating a dramatic reduction in dynamic range at the echo canceler output.
Figure 7B:
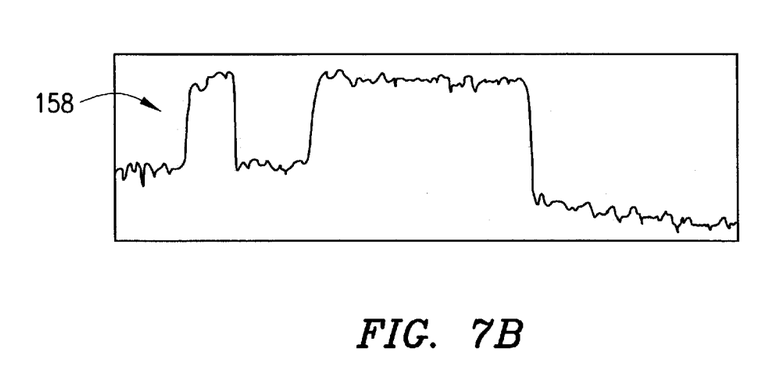

In a simulation performed concerning training of the echo cancellation system of the first type, the adaptive filter 130 finite impulse response length was chosen to be twenty-one tap. The adaptation results calculated in the frequency domain after approximately two-thousand steps of training are illustrated in FIG. 6. What this illustrates is that for a significant portion of the band of interest (for example, up to approximately the end of the overlap band in FIG. 2B), the adaptive filter response 150 substantially matches the echo response 152 producing echo leakage 154 levels in the range of up to minus fifty dB. A corresponding simulation performed concerning operation of the echo cancellation system of the first type (following training as simulated above) confirms the effectiveness of the echo cancellation operation. Transmit and receive signals corresponding to the non-overlapped spectral usage operation were simulated with the results illustrated in FIGS. 7A and 7B in the form of composite receive and echo canceler output signal PSD characteristics. What this illustrates is that the excessive dynamic range in the analog signal (see, FIG. 7A, generally at 156) is dramatically reduced at the echo canceler output (see, FIG. 7B, generally at 158) in the range of up to a fifty dB reduction.

Figure 9:
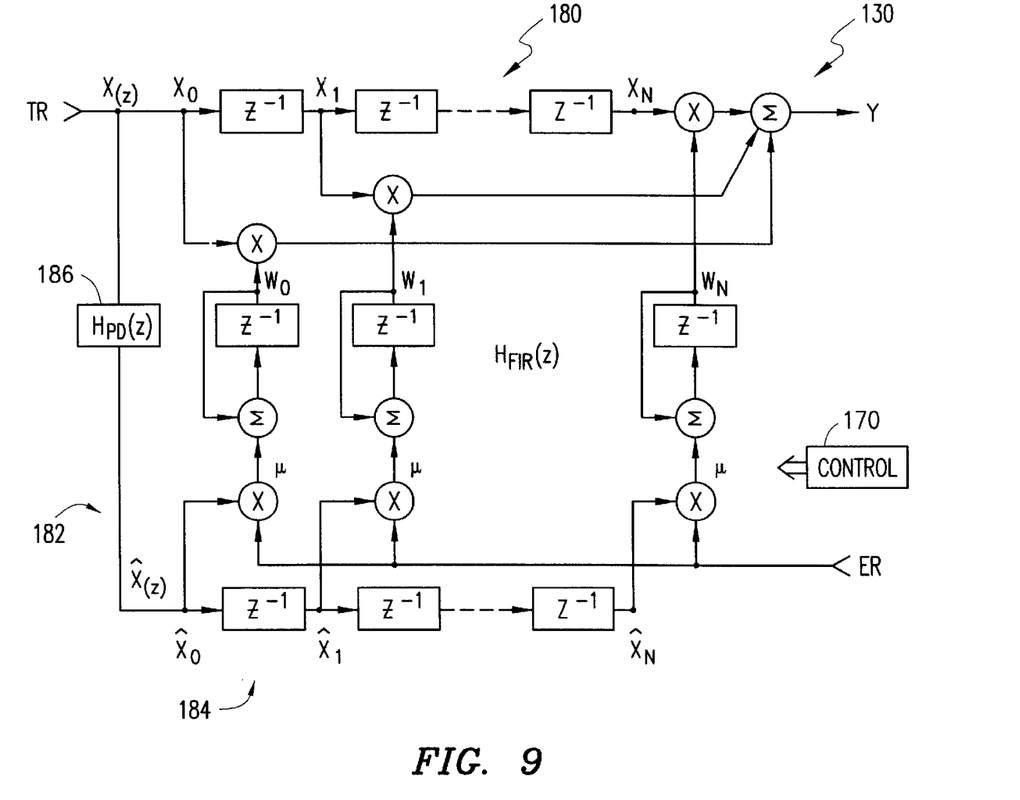
FIG. 9 is a signal flow graph for a least mean square finite impulse response adaptive filter modified in accordance with the present invention.

Based on the foregoing considerations to satisfy the relation (2) when there is filtering in the adaptation loop, a modification of the least mean square finite impulse response adaptive filter may be defined. A signal flow graph for such a modified filter is illustrated in FIG. 9. Again, this filter may be used for the adaptive filter 130 of the echo canceler 110 of FIG. 4. An additional n-tap delay line 184 with a filter block 186, whose transfer function $H_{PD}$ substantially matches the combined transfer function of $H_I \cdot H_E \cdot H_{RX} \cdot H_D$ for the adaptation loop, are employed to generate the required predistorted input vector used in the recursive tap weight update section 182 of the least mean square filter. With this configuration, the operation of the adaptive filter is predistorted to account for the amplitude and phase distortions introduced in the error signal ER by the transfer functions H for the components (interpolator 116', filter 120', filters 136 and decimator 140) of the echo channel 132 and receive channel 144. The goal of the training in this configuration (perhaps performed once in the factory), is to define the predistortion transfer function of the filter 186 in FIG. 9. This may be iachieved by configuring the modem as follows: switch 112(1) is placed in the "2" position, and switches 112(4), 112(5), 112(6) and 112(7) are placed in the "1" position. Adaptive filter feedback is connected by a way indicated at 146 in FIG. 4. The transmit channel is turned off, for example, by disabling the converter 118. Accordingly, during the training sequence the conventional operation performed by the adaptive filter 130 causes it transfer function to converge essentially to the inverted adaptation loop transfer function. After multiplying the adaptation result $H_{FIR}$ by minus one, this transfer function may be stored in non-volatile memory for subsequent use in the modem operation after deployment.

The transfer function $H_{PD}$ is realized in the digital domain. However, it is recognized that any given analog transfer function component appearing in the adaptation loop transfer function of $H_I \cdot H_E \cdot H_{RX} \cdot H_D$ may only be approximately reproduced in the digital domain. This presents a theoretical limitation on the design realization for the filter. Still further, it is recognized that setting the proper value for the adaptation constant p is required to ensure convergence. After the predistortion transfer function $H_{PD}$ is defined in the manner described above, the training mode for the echo canceler of the second type may be simplified as only one switch, 112(1), is needed to toggle between the train and operate modes of the modem.

Figure 10:
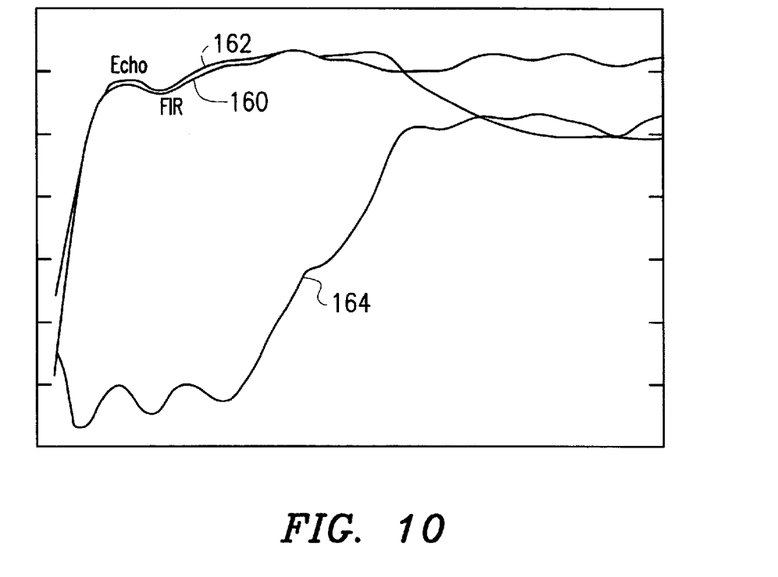
FIG. 10 is a frequency response diagram illustrating a correlation between adaptive filter response and echo response following training.
Figure 11A:
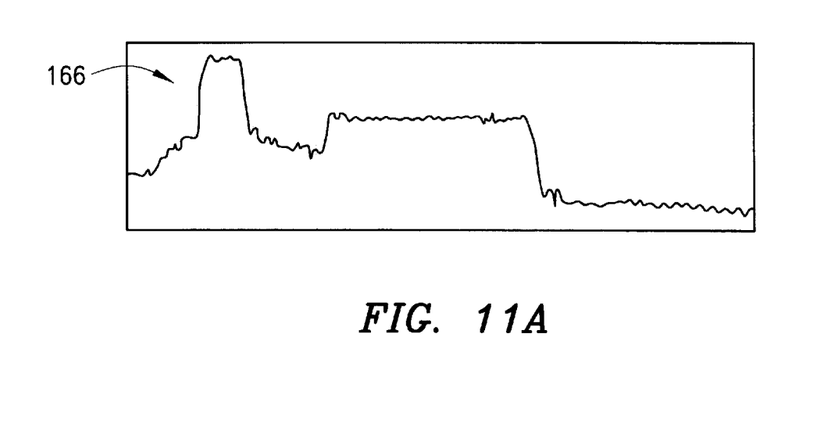
FIGS. 11A and 11B are frequency response diagrams illustrating a dramatic reduction in dynamic range at the echo canceler output.
Figure 11B:
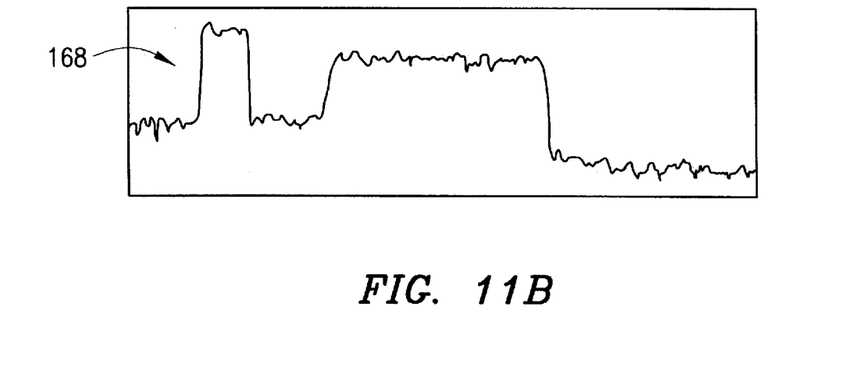

In a simulation performed concerning training of the echo cancellation system of the second type, the modified LMS adaptive filter 130 finite impulse response length was chosen to be seventeen tap with an eight tap predistortion filter. The adaptation results calculated in the frequency domain after approximately two-thousand steps of training are illustrated in FIG. 10. What this illustrates is that for a significant portion of the band of interest (for example, up to approximately the end of the overlap band in FIG. 2B), the modified LMS adaptive filter response 160 substantially matches the echo response 162 producing echo leakage 164 levels in the range of up to minus forty dB. A corresponding simulation performed concerning operation of the echo cancellation system of the send type (following training as simulated above) confirms the effectiveness of the echo cancellation operation. Transmit and receive signals corresponding to the non-overlapped spectral usage operation were simulated with the results illustrated in FIGS. 11A and 11B in the form of composite receive and echo canceler output signal PSD characteristics. What this illustrates is that the excessive dynamic range in the analog signal (see, FIG. 11A, generally at 166) is dramatically reduced at the echo canceler output (see, FIG. 11B, generally at 168) in the range of up to a forty dB reduction.

Use of the modified second type LMS adaptive filter 130 for the echo canceler 110 of FIG. 4 allows for the possibility of continuous mode operation (as opposed to training mode operation) with respect to the echo cancellation process. A benefit of such an operation is that adaptation of the filter 130 would continue within the echo canceler 110 following (or in the absence of) completion of training mode. Use of this mode could also imply the use of the actual transmit signal (instead of a training signal) for use in the modified LMS adaptive filter 130 as the training sequence. When configured for use within an ADSL modem 12 having automatic gain control and a transmit signal whose spectral and amplitude characteristics may vary considerably during operation (such as with the digital multi-tone modulation based G.Lite ADSL implementation), the modified LMS adaptive filter 130 response must continuously change in time. To support this operation, the echo canceler 110, and perhaps more specifically the adaptive filter 130, must include a parameter controller 170 implementing a real-time tracking algorithm to make necessary adjustments to the adaptation parameter $\mu$ in order to ensure convergence of the adaptive algorithm and stability of the echo canceler 110 under various conditions. For example, a choice of a specific value for the adaptation parameter $\mu$ out of a predetermined set may be linked to a particular gain setting in the receive programmable gain amplifier within the modem's automatic gain control system.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A bi-directional communications device including both an analog processing domain and a digital processing domain, comprising:
   a transmit channel spanning the digital and analog processing domains for processing a transmit signal;
   a receive channel spanning the analog and digital processing domains for processing a receive signal;
   a line interface in the analog processing domain for transmitting the transmit signal over a communications line, and for receiving the receive signal as corrupted by an unwanted echo component of the transmit signal from the communications line; and
   an echo channel spanning the digital and analog processing domains and including:
      a tap in the digital processing domain for tapping the transmit signal from the transmit channel;
      an adaptive filter in the digital processing domain for processing the tapped transmit signal to generate an echo cancellation signal, the adaptive filter having a transfer function substantially matching an echo transfer function which defines a relationship at the interface between the transmit signal and the unwanted echo component; and
      a converter for converting the echo cancellation signal to an analog echo cancellation signal; and
   wherein the receive channel further includes a summer in the analog processing domain for subtracting the analog echo cancellation signal from the echo component corrupted receive signal and outputting a corrected receive signal for further processing in the receive channel.

2. The communications device of claim 1 wherein the communications line comprises a twisted pair telephone line.

3. The communications device of claim 2 wherein the device comprises a modem.

4. The communications device of claim 3 wherein the modem comprises an Asymmetric Digital Subscriber Line (ADSL) modem.

5. The communications device of claim 1 wherein the transmit channel comprises:
   a first interpolator;
   a first digital-to-analog converter having an input connected to an output of the first interpolator;
   a first low pass filter having an input connected to an output of the first digital-to-analog converter; and
   a first amplifier driver having an input connected to an output of the first low pass filter and an output connected to the line interface.

6. The communications device of claim 5 wherein the echo channel comprises:
   the adaptive filter;
   a second interpolator having an input connected to an output of the adaptive filter;
   a second digital-to-analog converter having an input connected to an output of the second interpolator;
   a second low pass filter having an input connected to an output of the second digital-to-analog converter; and
   a second amplifier having an input connected to an output of the second low pass filter and an output connected to the summer.

7. The communications device of claim 6 wherein:
   the first and second interpolators have substantially matching transfer functions; and
   the first and second low pass filters have substantially matching transfer functions.

8. The communications device of claim 6 wherein the receive channel comprises:
   a line receiver having an input connected to an output of the summer;
   filter means having an input connected to an output of the line receiver;

an analog-to-digital converter having an input connected to an output of the filter means; and a decimator having an input connected to an output of the analog to digital converter.

9. The communications device of claim 8 further comprising:

a first switch moveable between an operating position connecting the transmit channel to receive the transmit signal and a training position connecting the transmit channel to receive a training signal;

a second switch moveable between an operating position wherein the first interpolator processes the transmit signal and a training position wherein the training signal is by-passed around the first interpolator;

a third switch moveable between an operating position wherein the first low pass filter processes the transmit signal and a training position wherein the training signal is by-passed around the first low pass filter.

10. The communications device of claim 8 further comprising:

a fourth switch moveable between an operating position wherein the second interpolator processes the echo cancellation signal output from the adaptive filter and a training position wherein the echo cancellation signal is by-passed around the second interpolator;

a fifth switch moveable between an operating position wherein the second low pass filter processes the echo cancellation signal and a training position wherein the echo cancellation signal is by-passed around the second low pass filter;

a sixth switch moveable between an operating position wherein the corrected receive signal is processed through the line receiver and filter means and a training position wherein the corrected receive signal comprising an error correction signal is by-passed around the line receiver and filter means; and a seventh switch moveable between an operating wherein the corrected receive signal is processed by the decimator and a training position wherein the error correction signal is routed to the adaptive filter.

11. The communications device of claim 10 further including a switch controller operating responsive to the initiation of communication through the communications device for moving certain ones of the switches into the training position for a short period of time necessary to adaptively configure the transfer function of the adaptive filter to substantially match the echo transfer function.

12. The communications device of claim 1 wherein the adaptive filter comprises a least mean square finite impulse response filter.

13. The communications device of claim 12 wherein the least mean square filter comprises:

a first n-tap delay line;

a recursive tap weight update section connected to the first n-tap delay line;

a predistortion filter having a transfer function substantially matching a combined transfer function for the echo channel and the receive channel; and a second n-tap delay line having an input connected to an output of the filter and an output generating a predistortion vector for input to the recursive tap weight update section.

14. An echo cancellation functionality, comprising:

an adaptation loop, including:

a receive channel for processing a received analog receive signal; and an echo channel, including:

a digital adaptive filter for processing a digital transmit signal to generate a digital echo cancellation signal, the adaptive filter having a transfer function substantially matching an echo transfer function which defines a relationship between the transmit signal and an unwanted echo component corrupting the analog receive signal; and a converter for converting the digital echo cancellation signal to an analog echo cancellation signal; and a summer operable to subtract the analog echo cancellation signal from the echo component corrupted analog receive signal and output the receive signal for further processing in the receive channel.

15. The echo cancellation functionality of claim 14 wherein adaptation loop has a combined transfer function and wherein the adaptive filter comprises:

an adaptation functionality responsive to an error correction signal for adaptively configuring an overall transfer function of the adaptive filter to substantially match the echo transfer functionality; and a predistortion functionality for predistorting the overall transfer function of the adaptive filter to account for the combined transfer function of the adaptation loop.

16. The echo cancellation functionality of claim 15 further including switch means operable to place the echo cancellation functionality in a training mode wherein adaptation loop processed signals by-pass certain components of the adaptation loop which contribute to the combined transfer function and wherein the receive channel generates the error correction signal for application to the adaptation functionality of the adaptive filter.

17. The echo cancellation functionality of claim 16 further including a switch controller for placing certain switch means into the training mode for a short period of time necessary to adoptively configure the overall transfer function of the adaptive filter to substantially match the echo transfer function.

18. The echo cancellation functionality of claim 15 wherein the predistortion functionality comprises:

a predistortion filter having a transfer function substantially matching the combined transfer function for the adaptation loop; and a first n-tap delay line having an input connected to an output of the filter and an output generating a predistortion vector; and wherein the adaptation functionality comprises:

a second n-tap delay line; and a recursive tap weight update section connected to the first n-tap delay line and responsive to the error correction signal and the predistortion vector to adaptively configure the overall transfer function to substantially match the echo transfer function.

19. The echo cancellation functionality of claim 14 wherein the adaptive filter comprises a least mean square finite impulse response filter.

20. A method, comprising the steps of:

processing a first signal in a transmit channel spanning a digital processing domain and an analog processing domain;

transmitting the first signal over a communications line;

receiving a second signal from the communications line, the second signal being corrupted by an unwanted echo component of the first signal;

processing the receive signal in a receive channel spanning the analog and digital processing domains;

tapping in the digital processing domain the first signal from the transmit channel;

adaptively filtering in the digital processing domain the tapped first signal to generate an echo cancellation signal, the adaptive filter having a transfer function substantially matching an echo transfer function which defines a relationship between the first signal and the unwanted echo component;

converting the echo cancellation signal to an analog echo cancellation signal; and subtracting in the analog processing domain the analog echo cancellation signal from the echo component corrupted second signal and outputting a corrected second signal for further processing in the receive channel.

21. The method of claim 20 further including the step of training the adaptive filter transfer function to substantially match the echo transfer function.

22. The method of claim 21 wherein the step of training is performed at the beginning of each new communication.

23. The method of claim 21 wherein the step of training comprises the steps of:

applying a training signal to the transmit channel as the transmit signal;

tapping in the digital processing domain the first training from the transmit channel;

adaptively filtering in the digital processing domain the tapped training signal to generate an echo cancellation training signal;

converting the echo cancellation training signal to an analog echo cancellation signal;

subtracting in the analog processing domain the analog echo cancellation training signal from the echo component corrupted second signal and outputting a corrected training signal; and adjusting the adaptive filter transfer function in response to the corrected training signal to drive the echo cancellation training signal closer to substantially zero.

24. The device of claim 1 further including an error signal generated by the receive channel in the digital domain and applied to the adaptive filter to tune the echo cancellation signal to substantially cancel the unwanted echo component.

25. The device of claim 24 wherein the error signal is generated during a training mode.

26. The functionality of claim 14 including an error signal generated by the receive channel in a digital domain and applied to the adaptive filter to tune the echo cancellation signal to substantially cancel the unwanted echo component.

27. The functionality of claim 26 wherein the error signal is generated during a training mode.

28. The method of claim 20 further including the steps of:

generating an error signal by the receive channel in the digital processing domain; and applying the error signal to tune the adaptive filtering step such that the echo cancellation signal substantially cancels the unwanted echo component.

29. The method of claim 28 wherein the steps of generating and applying are performed in connection with a training mode of operation.

30. The method of claim 20 wherein the step of adaptively filtering comprises the step of predistorting the transfer function for the adaptive filtering step to account for a combined transfer function of an adaptation loop formed by the steps of processing, tapping, adaptively filtering, converting and summing.

* * * * *

UNITED STATES PATENT AND TRADEMARK OFFICE
CERTIFICATE OF CORRECTION

PATENT NO. : 6,480,532 B1  Page 1 of 1
DATED : November 12, 2002
INVENTOR(S) : Albert Vareljian It is certified that error appears in the above-identified patent and that said Letters Patent is hereby corrected as shown below:

Column 2,
Line 38, replace "adaptive filter 24Y" with -- adaptive filter 24) --
Line 39, replace "summer 26 are" with -- summer 26) are --

Column 5,
Line 17, replace "received over a the line" with -- received over the line --

Column 6,
Line 65, replace "x(i) = [$x_o$ (i) ,$x_1$ (i) ...$x_N$ (i) ]" with -- x (i) = [$x_o$ (i) ,$x_1$ (i) ...$x_N$ (i) ] --

Column 8,
Line 48, replace "passed Although" with -- passed through --

Column 10,
Line 42, replace "This may be iacheived" with -- This may be achieved --
Line 62, replace "constant p is required" with -- constant $\mu$ is required --

Signed and Sealed this

Twenty-second Day of April, 2003

JAMES E. ROGAN
*Director of the United States Patent and Trademark Office*